United States Patent [19]

Senda et al.

[11] 4,291,010

[45] Sep. 22, 1981

[54] HEAT STABLE YELLOW IRON OXIDES

[75] Inventors: Jihei Senda; Yoshihiro Inoue; Toshiaki Uenishi; Hidefumi Harada; Kouji Nakata; Akio Akagi, all of Ube, Japan

[73] Assignee: Titan Kogyo Kabushiki Kaisha, Ube, Japan

[21] Appl. No.: 72,805

[22] Filed: Sep. 5, 1979

[51] Int. Cl.$^3$ .................... C01F 7/30; C01G 49/02
[52] U.S. Cl. ................................ 423/594; 423/633
[58] Field of Search .............. 423/594, 633, 634; 106/308 B; 252/62.58, 62.59

[56] References Cited

U.S. PATENT DOCUMENTS

| | | | |
|---|---|---|---|
| 3,382,174 | 5/1968 | Hund et al. | 423/634 |
| 3,947,502 | 3/1976 | Leitner et al. | 423/634 |
| 3,969,494 | 7/1976 | Nobuoka et al. | 423/634 |
| 4,006,090 | 2/1977 | Beck | 423/634 |
| 4,140,539 | 2/1979 | Hund et al. | 423/633 |

OTHER PUBLICATIONS

Ervin and Osborn, *J. Geology*, vol. 59 (1951).
T. Ando, *Powder and Powder Metallurgy*, vol. 13, No. 1 (1966).

*Primary Examiner*—O. R. Vertiz
*Assistant Examiner*—Wayne A. Langel
*Attorney, Agent, or Firm*—George L. Rushton

[57] ABSTRACT

Synthetic yellow iron oxide ($\alpha$-FeOOH) is dispersed in an aqueous ferric solution, and an adequate alkali solution and an aqueous aluminum salt solution are added. The resultant dispersion is subjected to a hydrothermal treatment at 150°–250° C. By this treatment, the surface of the synthetic yellow iron oxide is covered with a (FeAl)OOH (solid solution). Yellow iron oxides treated thus have an elevated resistivity to heat of about 50° C. The modified synthetic yellow iron oxide thus obtained is non-toxic and can be used as a pigment in plastics and melt-type traffic paint.

7 Claims, 6 Drawing Figures

HEAT STABLE YELLOW IRON OXIDES

BACKGROUND OF THE INVENTION

This invention relates to yellow iron oxide pigments of greatly improved thermal stability and enchanced color quality.

The yellow pigments which are available today include lead chromate, strontium chromate, cadmium sulfide, benzidine yellow, etc. However, since these pigments are invariably noxious or carcinogenic substances, use of these pigments will be increasingly more restricted in the future with a view to preserving human health and reducing environmental pollution. In view of the likelihood of such restriction, industries which produce or use coloring materials anxiously await the development of an excellent innocuous yellow pigment capable of taking the place of such noxious yellow pigments as mentioned above.

The principal drawback associated with yellow iron oxide pigments is a lack of thermal stability. Hydrated iron oxides ($\alpha$-FeOOH), when heated above approximately 200° C., begin to lose water of hydration and change from the desirable yellow color to red or brown.

This thermal instability of the hydrated iron oxides limits the applications where these very desirable pigments can be used. Thus, hydrated ferric oxide would constitute a very useful alternative for certain applications if it possessed sufficient thermal stability. Others have sought to overcome the problem of lack of thermal stability, and other deficiencies, in iron oxides. For example:

1. A method of surface coating $\alpha$-FeOOH with aluminum or silica salts at normal pressure. (No. 49-16531 Japan)
2. A method of surface coating $\alpha$FeOOH with metal oxide, as induced water soluble metal compounds, by using an autoclave. (No. 49-16531 Japan)
3. In an aqueous alkaline solution, a method to convert imperfect crystals to perfect crystals and control of particle distribution by hydrothermal treatment. (Unexamined Pat. No. 50-115698 Japan, published as No. 53-28158 Japan, and now U.S. Pat. No. 3,969,494).

The yellow iron oxide pigments which are treated by these methods, however, don't always have a sufficient heat stability compared with such aforesaid noxious yellow pigments. Therefore, the inventors have been studying how to improve the heat stability of yellow iron oxide. We have formed a heat stable yellow iron oxide by subjecting the colloidal dispersions obtained from an aqueous ferric salt solution, an alkali solution, and an aqueous aluminum solution to a hydrothermal treatment at 100°–250° C. for more than about 30 minutes.

The product of this invention exhibits remarkable thermal stability that is greater than the products from the prior art methods.

Heat stable yellow iron oxide of this invention possesses a film or coating of (FeAl)OOH (solid solution) on the surface of the yellow iron oxide pigment.

This dramatic improvement in thermal stability means that the yellow iron oxide of this invention can be used for melt-type traffic paint and in a majority of plastics requiring elevated heat stability, where commercial yellow iron oxides cannot be used.

SUMMARY OF THE INVENTION

The present invention provides a hydrothermal treatment in which yellow iron oxide is dispersed in a mixture of aqueous ferric sulfate solution, an alkali solution, and an aqueous aluminum solution.

The resultant dispersion is subjected to a hydrothermal treatment at 100°–250° C., such as heating the dispersion in an autoclave under pressure at 180° C. This treatment causes the surface of the yellow oxide to become at least partially covered with a coating or film of (FeAl)OOH (solid solution). By this treatment, the thermal stability temperature is increased by about 50° C., that is, to a range of approximately 200°–250° C.

The modified synthetic yellow iron oxide thus obtained is used as coloring pigment for melt-type traffic paint and in a majority of plastics in the place of prior art pigments. The present invention also comprises a process for the manufacture of the thermally stable yellow iron oxide product described above, wherein an aqueous slurry comprising said yellow iron oxide ($\alpha$-FeOOH), ferric sulfate, water-soluble or alkali-soluble aluminum salt, and adequate alkali is heated at a temperature of about 100°–250° C. until a film of (FeAl)OOH (solid solution) precipitates on the surface of said oxide, and the resulting coated oxide product is recovered.

The hydrothermal treatment lasts for a period of from about one-half to about 4 hours, depending on the temperature. A preferred treatment is 180° C. for one hour.

Broadly, the invention comprises the aspects of
(a) forming the solid solution (FeAl)OOH,
(b) the compound (FeAl)OOH,
(c) forming a yellow iron oxide having at least a partial coating of (FeAl)OOH, and
(d) the composition of $\alpha$-FeOOH having at least a partial coating of (FeAl)OOH.

DETAILED DESCRIPTION OF THE INVENTION

Hydrated ferric oxide loses water at about 200° C. and, in the process, changes from yellow to red or brown iron oxide. This thermal decompostion, accompanied by the color change, limits the application for which yellow iron oxide pigment can be used. In the course of studying methods of improving the thermal stability of yellow iron oxide, we found that the thermal stability and, consequently, the color stability of the yellow iron oxide could be dramatically improved by depositing (FeAl)OOH (solid solution) onto at least a portion of the surface of the yellow iron oxide particles. Furthermore, it was found that the greatest improvement would be effected by surface treating with (FeAl)OOH (solid solution), using an autoclave under saturated pressure of steam of the order of about 15 kg/cm$^2$.

Now, a description will be given with respect to the construction of the present invention.

T. Ando reported that a certain curing (aging or growth period) at room temperature was required when a sodium hydroxide solution was added to a solution of ferric sulfate or ferric chloride, with pH values maintained above about 10. The precipitate was given the hydrothermal treatment in order to produce a yellow iron oxide. (Powder and Powder Metallurgy, Vol. 13 No. 1, 1966). This curing at room temperature is essential to make a yellow iron oxide, because if a hydrothermal treatment is done without curing, the products exhibit two-phase characterization, such as $\alpha$-iron oxide ($\alpha$-Fe$_2$O$_3$) (red) and $\alpha$-iron hydroxide ($\alpha$-FeOOH) (yellow).

On the other hand, if an aluminum salt is added to the aforementioned solution to make a (FeAl)OOH (solid solution), regardless of sufficient curing, it was found by the present inventors that two phases, not only $\alpha$-iron yellow hydroxide but also $\alpha$-iron red oxide, are produced by hydrothermal treatment. It appears that the aluminum salt inhibits the curing effect.

The problem investigated was how to produce a single phase of yellow iron oxide under these conditions. Consequently, it was discovered that the formation of red $\alpha$-iron oxide was suppressed, reduced, or prevented if, after curing, a water-soluble or alkali-soluble aluminum salt, such as sodium aluminate, together with water-soluble silica salts, tin salts, or zinc salts was added. Typically, the tin and zinc salts can be substituted for the silica salts. The amount of soluble aluminum salt added is more than 20 wt.%, based on the soluble ferric salt used. For example, the amount of aluminum salt can be from 35 to 129 wt.% of the ferric salt. The amount of these added salts is about 0.3–5.0% of the aluminum included in the aluminum salts. The product produced by such a hydrothermal treatment possessed single phase yellow iron oxide.

The pH of the reaction mixture of alkali and ferric salts is over 10, such as from 10 to about 13.

If yellow iron oxide is present in the solution beforehand, to act as seed, it is able to produce a (FeAl)OOH solid solution without curing, or without curing and addition of silica salts, tin salts, or zinc salts.

The following examples are presented to illustrate the present inventions more fully.

EXAMPLE I

Formation of (FeAl)OOH (no yellow iron oxide seed present)

A solution of 50 g/l sodium hydroxide solution was added to 500 ml of ferric sulfate solution having a concentration of 60 g/l as Fe$_2$(SO$_4$)$_3$ until the pH value was about 12. The precipitated material was then cured about 23 hours at room temperature. Then, 19.4 ml of sodium aluminate solution having a concentration of 291 g/l as Al$_2$O$_3$ and 6.7 ml sodium silicate solution having a concentration of 20 g/l as SiO$_2$ were added. The resultant dispersion was subjected to a hydrothermal treatment carried out at 180° C. for one hour, using a stainless steel autoclave. In this case, the pH of this dispersion, after the addition of the sodium silicate solution, was about 13.

The precipitates of (FeAl)OOH formed as a consequence of this hydrothermal treatment were separated from the mother liquor, washed with water until electroconductivity values of the filtrate were below 100 $\mu\psi$/cm, filtered, and dried at 120° C. for 4 hours in electric oven. The dried material was pulverized (with a sample mill), giving a final product which was a (FeAl)OOH solid solution.

The results of X-ray diffraction and Differential Thermal Analysis (DTA) on the product are as shown in Table I and Table II. Commercial yellow iron oxide and three kinds of yellow iron oxide were also treated by the aforementioned treatment for comparison. The results also are shown in Table I and Table II. The differential thermal analyses were recorded under the following conditions:

| INSTRUMENT FACTORS | |
|---|---|
| Sample weight | 300 mg |
| Atmosphere | dry air |
| Heating rate | 5° C./min |
| Standard sample | $\alpha$-Al$_2$O$_3$ |

In Table I and Table II, mark (1) is commercial yellow iron oxide (Mapico LL-XLO, equivalent to Mapico 1050; Cities Service Co.); mark (2) is yellow iron oxide coated with aluminum hydroxide, as described in Japanese unexamined Pat. No. 51-66320; mark (3) is the yellow iron oxide sample of mark (2), hydrothermally treated at 180° C. for one hour, according to the procedure of Japanese Pat. No. 49-16531; mark (4) is the yellow iron oxide of mark (2) which was hydrothermally treated in sodium hydroxide solution at 180° C. for 5 hours, as described in Japanese unexamined Pat. No. 50-115698; and mark (5) is (FeAl)OOH, as obtained by the present invention.

TABLE I (X-Ray Data)

| 1 Commercial iron oxide | | 2 Yellow iron oxide coated with aluminum hydroxide | | 3 Yellow iron oxide obtained by hydrothermal treatment of sample 1 | | 4 Yellow iron oxide obtained by hydrothermal treatment in NaOH solution | | 5 (FeAl)OOH obtained by present invention | | | | |
|---|---|---|---|---|---|---|---|---|---|---|---|---|
| d | I/Io | d | I/Io | d | I/Io | d | I/Io | d | I/Io | h | k | l |
| 5.00 | 15 | 4.99 | 16 | 5.00 | 13 | 4.99 | 16 | 4.93 | 16 | 0 | 2 | 0 |
| 4.20 | 100 | 4.19 | 100 | 4.20 | 100 | 4.20 | 100 | 4.15 | 100 | 1 | 1 | 0 |
| 3.39 | 10 | 3.39 | 10 | 3.39 | 10 | 3.39 | 13 | 3.35 | 11 | 1 | 2 | 0 |
| 2.70 | 38 | 2.70 | 38 | 2.70 | 38 | 2.70 | 43 | 2.66 | 30 | 1 | 3 | 0 |
| 2.59 | 15 | 2.59 | 16 | 2.59 | 12 | 2.59 | 12 | 2.55 | 16 | 0 | 2 | 1 |
| 2.52 | 6 | 2.53 | 6 | 2.53 | 4 | 2.53 | 5 | 2.50 | 7 | 1 | 0 | 1 |
| 2.49 | 15 | 2.49 | 14 | 2.49 | 14 | 2.49 | 14 | 2.46 | 16 | 0 | 4 | 0 |
| 2.453 | 55 | 2.451 | 58 | 2.453 | 54 | 2.453 | 53 | 2.424 | 59 | 1 | 1 | 1 |
| 2.255 | 17 | 2.255 | 18 | 2.256 | 14 | 2.255 | 12 | 2.228 | 19 | 1 | 2 | 1 |
| 2.193 | 23 | 2.191 | 24 | 2.193 | 22 | 2.193 | 25 | 2.165 | 21 | 1 | 4 | 0 |
| 1.923 | 5 | 1.923 | 7 | 1.922 | 4 | 1.923 | 5 | 1.875 | 5 | 0 | 4 | 1 |
| 1.803 | 7 | 1.802 | 8 | 1.803 | 7 | 1.803 | 9 | 1.785 | 6 | 2 | 1 | 1 |
| 1.721 | 23 | 1.720 | 25 | 1.720 | 24 | 1.720 | 26 | 1.700 | 18 | 2 | 2 | 1 |
| 1.693 | 8 | 1.691 | 7 | 1.693 | 9 | 1.693 | 10 | 1.672 | 6 | 2 | 4 | 0 |
| 1.604 | 5 | 1.605 | 3 | 1.605 | 4 | 1.607 | 5 | 1.587 | 3 | 2 | 3 | 1 |
| 1.565 | 15 | 1.564 | 17 | 1.565 | 14 | 1.565 | 15 | 1.544 | 11 | 151 | | 160 |
| 1.511 | 8 | 1.510 | 10 | 1.510 | 8 | 1.510 | 7 | 1.491 | 9 | 250 | | 002 |
| | | a$_0$ = 4.60 | | | | | | a$_o$ = 4.56 | | | | |
| | | b$_o$ = 10.00 | | | | | | b$_o$ = 9.84 | | | | |

TABLE I-continued (X-Ray Data)

| 1 Commercial iron oxide | | 2 Yellow iron oxide coated with aluminum hydroxide | | 3 Yellow iron oxide obtained by hydrothermal treatment of sample 1 | | 4 Yellow iron oxide obtained by hydrothermal treatment in NaOH solution | | 5 (FeAl)OOH obtained by present invention | | | | |
|---|---|---|---|---|---|---|---|---|---|---|---|---|
| d | I/Io | d | I/Io | d | I/Io | d | I/Io | d | I/Io | h | k | l |
| $c_o = 3.03$ | | | | | | | | $c_o = 2.99$ | | | | |

TABLE II

Differential Thermal Analysis Data

| Sample | Decomposition temperature (°C.) | Peak temperature (°C.) |
|---|---|---|
| 1. Commercial yellow iron oxide | 226 | 331 |
| 2. Yellow iron oxide coated with aluminum hydroxide | 238 | 338 |
| 3. Yellow iron oxide obtained by hydrothermal treatment of sample 2 | 238 | 336 |
| 4. Yellow iron oxide obtained by hydrothermal treatment in sodium hydroxide solution | 255 | 346 |
| 5. (FeAl)OOH obtained by present invention | 277 | 398 |

It is evident from Table I that for the (FeAl)OOH as obtained by the treatment of the present invention, the lattice constant shows $a_o=4.56$ Å, $b_o=9.84$ Å, $c_o=2.99$ Å, which is smaller than those of another yellow iron oxide. The lattice constant of the other yellow iron oxides shows $a_o=4.60$ Å, $b_o=10.00$ Å, $c_o=3.03$ Å.

It is also evident from Table II that, for the (FeAl)OOH obtained by the present invention, the decomposition temperature and peak temperature by DTA at 277° C. and 398° C., respectively, are higher than those of prior art yellow iron oxides.

It is reported that yellow iron oxide ($\alpha$-FeOOH) and diaspore ($\alpha$-AlOOH) have a similar crystal structure and that (1) the lattice constant of diaspore is $a_o=4.40$ Å, $b_o=9.39$ Å, $c_o=2.80$ Å, which is smaller than the constant of yellow iron oxide (Palache, L. G. et al., The System of Mineralogy, 7th Ed., Vol. 1, J. Wiley and Sons, New York, 1944), and (2) the decomposition temperature of diaspore ($T_d$ of 400°) is higher by about 200° C. than that of yellow iron oxide. (B. Yoshigi, Mineral Technology, Kihodo, Tokyo, Japan, 1959).

From the above observations, we believe that the product obtained by the present invention has a (FeAl)OOH characterization (solid solution), since the heat stability of synthetic yellow iron oxide was improved. In the hydrothermal treatment, pH values of the colloidal solution are preferred at above 12.5, because if the pH is lower than about 12.5, a boehmite ($\nu$-AlOOH) is formed with yellow iron oxide in the solution.

EXAMPLE II

Formation of (FeAl)OOH (yellow iron oxide seed present)

Commercial yellow iron oxide (20 g.) was added to 500 ml ferric sulfate solution having a concentration of 45 g/l as $Fe_2(SO_4)_3$. The mixture was stirred, and 500 ml sodium hydroxide solution having a concentration of 60 g/l, 29 ml of sodium aluminate solution having a concentration of 291 g/l as $Al_2O_3$, and 5 ml sodium silicate solution having a concentration of 20 g/l as $SiO_2$ were added. The resultant dispersion was subjected to hydrothermal treatment at 180° C. for one hour. The slurry thus obtained was removed from the autoclave and filtered to separate the precipitate from the mother liquor. The precipitate was washed with water, dried, and pulverized in the same way as example I.

The yellow iron oxide with at least a partial coating of (FeAl)OOH which was obtained in this method showed high heat stability. For example, the product exhibited a decomposition temperature of 283° C., which is higher than that of untreated yellow iron oxide (228° C.).

On the other hand, to compare the heat stability of treated and untreated samples, paint panels were made and tested. The color results are shown in Table III. The paint was formulated as follows:

| Yellow iron oxide | 8 g |
|---|---|
| Oil-free alkyd resin (M6401, Japan Reichold Chemicals, Inc.) | 40 g |
| Xylol | 4 g |
| Beads (GB 503, Bridgestone Glassbeads Ltd.) | 40 g |

The above mixture was placed in a 150 ml container placed in a paint conditioner (Red Devil Co.), and shaken for 20 min. Then, the product was coated on an aluminum plate (0.1 m/m thickness), using a barcoater, and baked at various temperatures for 15 min.

Each baked panel was measured using a NIHON-DENSYOKU color and color difference meter. The results were expressed as HUNTER L a b units. The total color difference ($\Delta E$) is based on comparing the 150° C. baked panel and the other panels baked at other temperatures. A smaller $\Delta E$ indicated less color change and, hence, better thermal stability.

TABLE III

| | 150° C. × 30 min | | | | 200° C. × 15 min | | | | 220° C. × 15 min | | | |
|---|---|---|---|---|---|---|---|---|---|---|---|---|
| | L | a | b | $\Delta E$ | L | a | b | $\Delta E$ | L | a | b | $\Delta E$ |
| Raw material (untreated iron oxide) | 49.0 | 15.1 | 28.7 | — | 48.1 | 15.5 | 28.2 | 1.10 | 47.1 | 16.0 | 27.2 | 2.58 |
| Yellow iron oxide obtained by present invention | 46.3 | 15.1 | 28.7 | — | 46.3 | 17.7 | 27.5 | 0.32 | 45.5 | 18.0 | 27.3 | 0.96 |

| 240° C. × 15 min. | 260° C. × 15 min. | 280° C. × 15 min |
|---|---|---|

TABLE III-continued

| L | a | b | ΔE | L | a | b | ΔE | L | a | b | ΔE |
|---|---|---|---|---|---|---|---|---|---|---|---|
| 45.6 | 16.5 | 26.1 | 4.50 | 37.1 | 22.6 | 20.3 | 16.4 | 28.7 | 23.5 | 13.5 | 26.7 |
| 45.3 | 18.1 | 27.1 | 1.26 | 44.9 | 18.7 | 26.5 | 1.97 | 40.8 | 19.1 | 19.0 | 10.5 |

It is clear from the preceeding Table III that, as a consequence of the treatment according to the present invention, the temperature at which a change of color occurs (ΔE 1.5) (NBS) was increased by about 50° C., from about 200°–210° C. to about 250°–260° C.

Improved heat stability was shown by (1) the decomposition temperature (by DTA) was higher by about 30° C. than that of hydrothermal treatment of commercial yellow iron oxide and (2) the shape of yellow iron oxide treated by this invention was different from iron oxide having only hydrothermal treatment. Therefore, the reason why the heat stability was improved was thought to be due to the fact that heat stable (FeAl)OOH was coated onto the surface of yellow iron oxide and not due to the hydrothermal treatment. Consequently, since the product obtained by the method of the invention has the following characteristics compared with example I, it is advantageous on a commercial basis:

(1) curing of the colloidal suspension is not necessary.
(2) particle size of the commercial yellow iron oxide is easily controlled.
(3) color control of yellow iron oxide is simplified.

EXAMPLE III

Commercial yellow iron oxide, (Mapico LL-XLO, equivalent to Mapico 1050) (20 g.) was added to 500 ml ferric sulfate solution having a concentration of 27 g/l as $Fe_2(SO_4)_3$. Then, with stirring, were added 500 ml sodium hydroxide solution having a concentration of 50 g/l and 29 ml. sodium aluminate solution having a concentration of 291 g/l as $Al_2O_3$. The resultant dispersion was subjected to hydrothermal treatment at 180° C. for one hour. The slurry thus obtained was removed from the autoclave and filtered to separate the precipitate from the mother liquor. The precipitate was washed with water, dried, and pulverized in the same way as in example I, resulting in heat-stable yellow iron oxide. The decomposition temperature of this product, by DTA, was about 30° C. higher, from 227° C. to 261° C., as compared to the starting iron oxide product. Also, examination of results from Table IV are shown, in which the change of color (ΔE=1.5; NBS) was higher by about 40° C., from 200°–210° C. to 240°–250° C.

It is to be noted that Ex. III shows the formation of (FeAl)OOH, with yellow oxide seed present, in a lower concentration of ferric salt solution and in the absence of silicate ions.

The amount of alkali, such as NaOH, added to the mixture is that which is necessary to give a pH of the resultant slurry mixture a pH of between 10 and 13, preferably about 12. The addition of sodium silicate, chosen as the preferred silicate of an alkali metal hydroxide, typically maintains of pH of about 12–13.

Based on the amount of soluble ferric salt used in the slurry, the amount of soluble aluminum salt used varies between about 35 and 120 wt.%.

Figure 1:
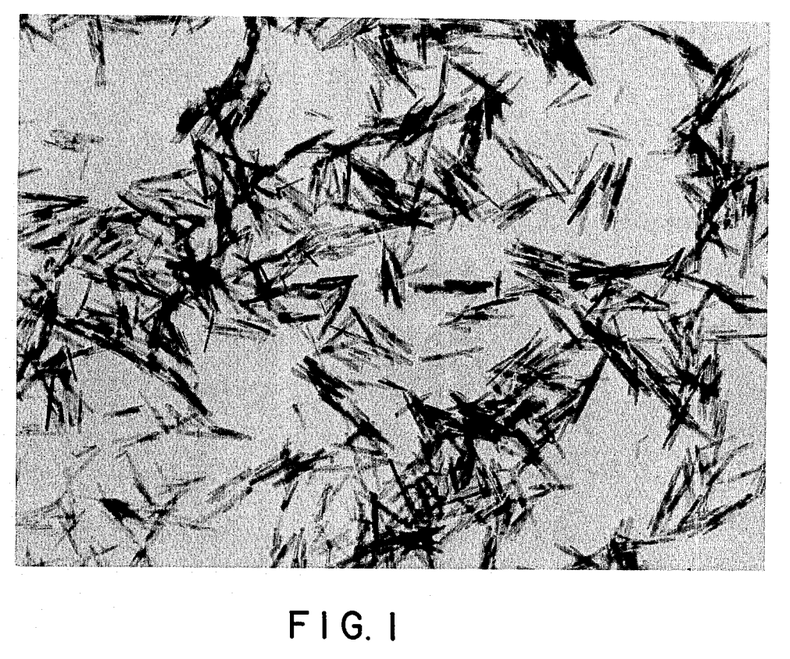
FIG. 1 is an electron microphotograph of yellow iron oxide treated by the method of the present invention (example I.)
Figure 2A:
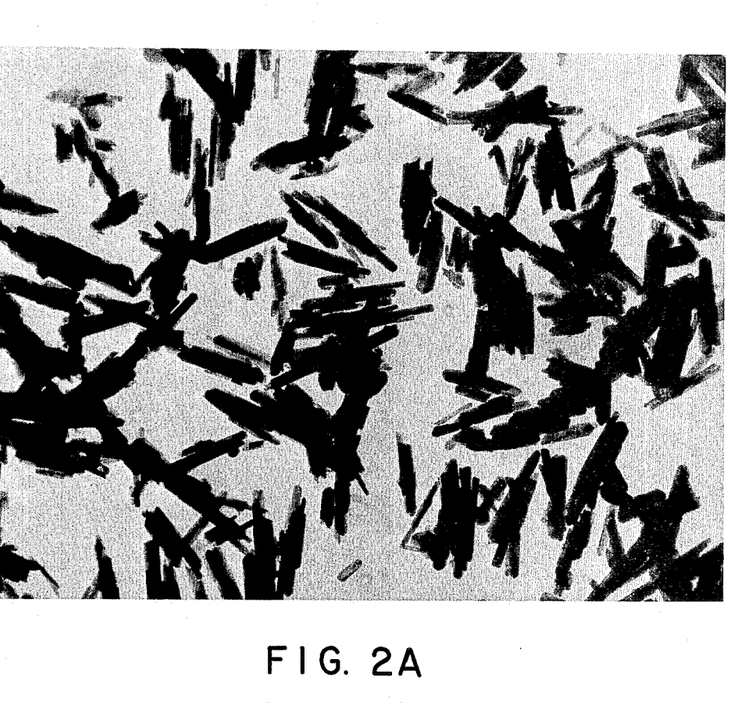
FIG. 2A is an electron microphotograph of the raw material of example III.
Figure 2B:
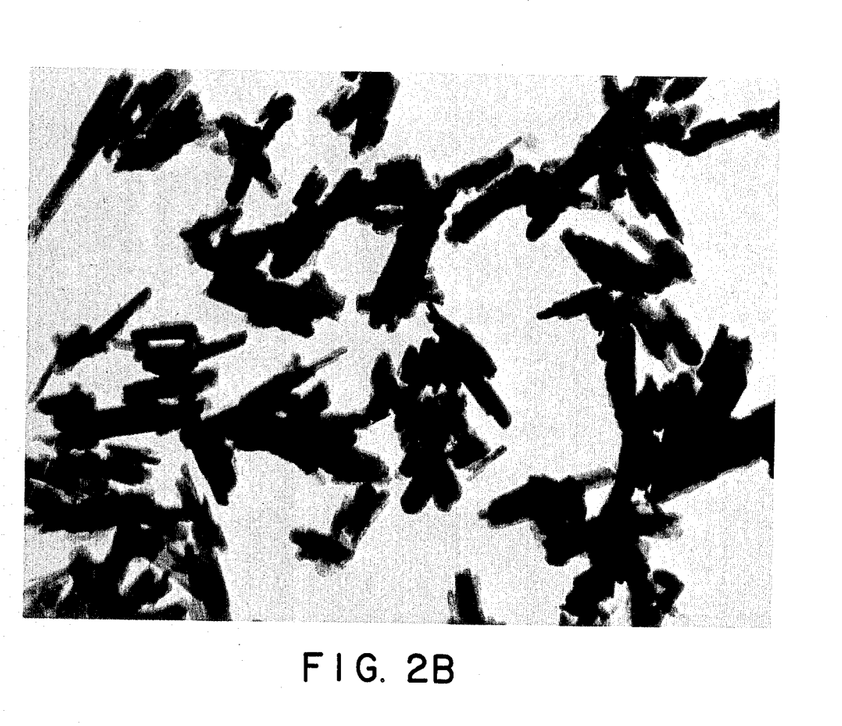
FIG. 2B is an electron microphotograph of yellow iron oxide treated by the method of the present invention (example II).
Figure 3A:
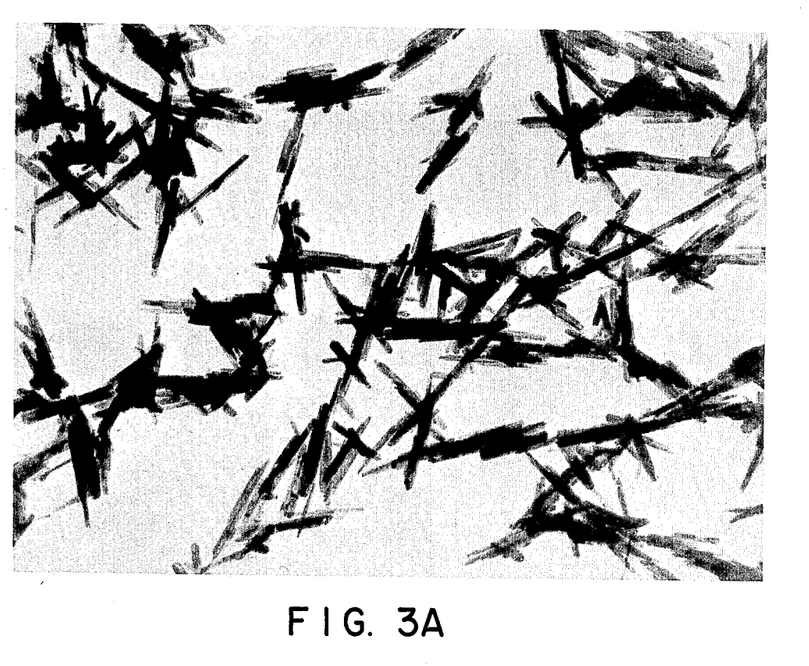
FIG. 3A is an electron microphotograph of untreated yellow iron oxide.
Figure 3B:
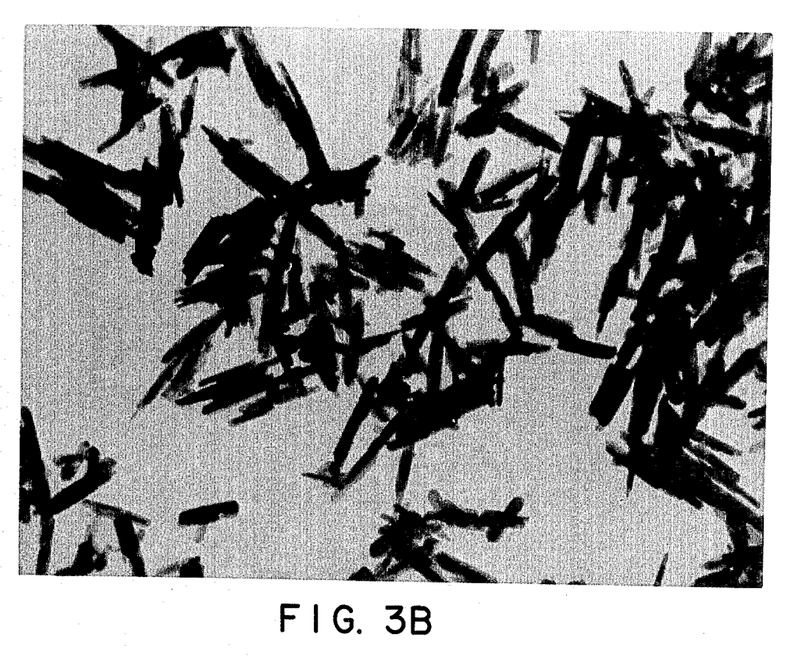
FIG. 3B is an electron microphotograph of yellow iron oxide treated by the method of the present invention (example III).
Figure 4:
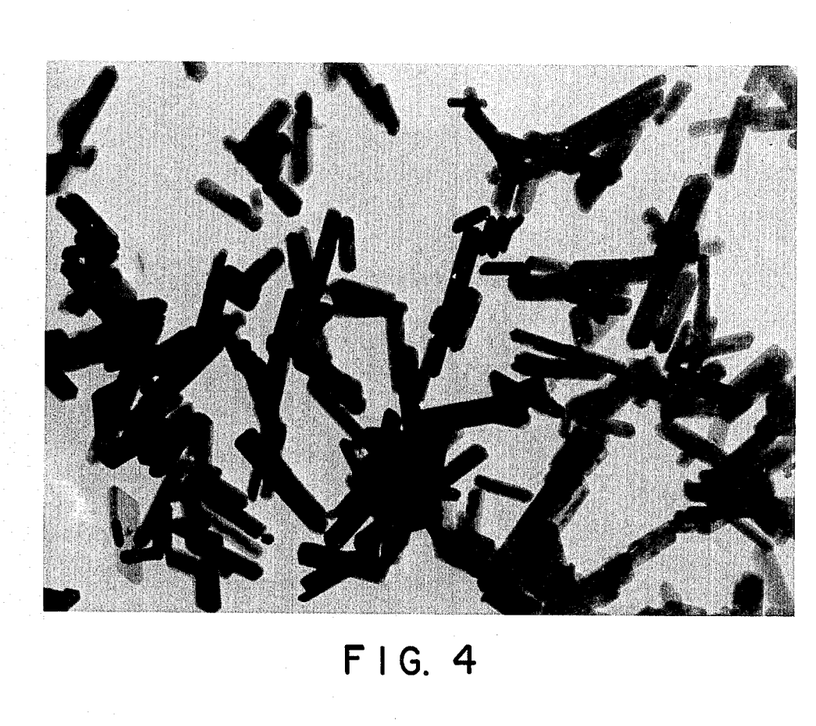
FIG. 4 is an electron microphotograph of the product obtained by hydrothermal treatment of commercial yellow iron oxide in alkali solution as in U.S. Pat. No. 3,969,494.

The magnification of the electron microphotographs is 50,000.

We claim:
1. A method of preparing a yellow iron oxide having improved heat stability, comprising the steps of:
   (a) forming an aqueous slurry of yellow iron oxide (α-FeOOH), ferric sulfate, an alkali-metal hydroxide, and sodium aluminate,
   (b) subjecting the resultant mixture to hydrothermal treatment,
   (c) separating the treated mixture into a solid phase and a liquid phase, and
   (d) recovering the solid phase, consisting essentially of yellow iron oxide having at least a partial coating of (FeAl)OOH solid solution.
2. The method of claim 1, wherein
   (a) the alkali metal hydroxide is sodium hydroxide,
   (b) the hydrothermal treatment comprises heating the material, under autogenous pressure, at a tempera-

TABLE IV

| | 150° C. × 30 min | | | | 200° C. × 15 min | | | | 240° C. × 15 min | | | |
|---|---|---|---|---|---|---|---|---|---|---|---|---|
| | L | a | b | ΔE | L | a | b | ΔE | L | a | b | ΔE |
| Raw material (untreated iron oxide) | 48.8 | 13.0 | 26.8 | — | 48.5 | 13.9 | 26.2 | 1.12 | 46.2 | 14.6 | 25.3 | 3.32 |
| Yellow iron oxide obtained by present invention | 50.4 | 15.5 | 28.6 | — | 50.0 | 15.5 | 28.5 | 0.41 | 49.5 | 15.6 | 28.1 | 1.03 |

| 260° C. × 15 min | | | | 280° C. × 15 min | | | |
|---|---|---|---|---|---|---|---|
| L | a | b | ΔE | L | a | b | ΔE |
| 33.9 | 21.1 | 17.2 | 19.4 | 30.0 | 17.7 | 10.4 | 25.3 |
| 47.7 | 17.4 | 26.0 | 4.20 | 39.6 | 20.2 | 17.6 | 16.1 | ture of from about 100° C. to about 250° C. and for a time greater than about 30 minutes, (c) sodium silicate is sodium silicate is added to the mixture prior to the hydrothermal treatment, and (d) the amount of sodium aluminate added is more than 20 wt.% based on the ferric sulfate.

3. The method of claim 2 wherein the temperature of the hydrothermal treatment is about 180° C. and the time is from about one-half hour to about 4 hours, and the amount of silicate added is about 0.3–5.0 wt.% based on the aluminum of the sodium aluminate.

4. A method of preparing FeAl(OOH), comprising the steps of:

(a) forming an aqueous slurry of ferric sulfate and an alkali metal hydroxide, (b) curing the slurry, until α-FeOOH seeds are formed, (c) adding sodium aluminate to the cured slurry, (d) subjecting the resultant slurry to hydrothermal treatment, and (e) separating the treated slurry into a solid phase and a liquid phase, with the solid phase consisting essentially of solid solution (FeAl)OOH.

5. The method of claim 4, wherein:

(a) the alkali metal hydroxide is sodium hydroxide, (b) the hydrothermal treatment comprises heating the slurry under autogenous pressure, at a temperature of 100°–250° C. for a period of more than about 30 minutes, and (c) the pH of the formed slurry is greater than about 10, (d) the amount of sodium aluminate added is more than 20 wt. % based on the ferric sulfate, and (e) sodium silicate, in an amount of about 0.3–5.0 wt. % based on the aluminum of the, sodium aluminate is added to the slurry mixture prior to the hydrothermal treatment.

6. A composition of α-FeOOH having at least a partial film or coating of (FeAl)OOH solid solution.

7. The solid solution of the compound (FeAl)OOH.

* * * * *